(12) United States Patent
Ahlstrom et al.

(10) Patent No.: US 11,679,870 B2
(45) Date of Patent: Jun. 20, 2023

(54) APPARATUS FOR REDUCING DRAG OF A TRANSVERSE DUCT EXIT FLOW

(71) Applicant: AERO DESIGN LABS LLC, Ft. Worth, TX (US)

(72) Inventors: Eric A. Ahlstrom, Willard, UT (US); Lee Sanders, Ft. Worth, TX (US)

(73) Assignee: Aero Design Labs LLC, Ft. Worth, TX (US)

( * ) Notice: Subject to any disclaimer, the term of this patent is extended or adjusted under 35 U.S.C. 154(b) by 168 days.

(21) Appl. No.: 16/958,606

(22) PCT Filed: Dec. 13, 2018

(86) PCT No.: PCT/US2018/065452
§ 371 (c)(1),
(2) Date: Jun. 26, 2020

(87) PCT Pub. No.: WO2019/133276
PCT Pub. Date: Jul. 4, 2019

(65) Prior Publication Data
US 2020/0331592 A1    Oct. 22, 2020

Related U.S. Application Data

(60) Provisional application No. 62/611,143, filed on Dec. 28, 2017.

(51) Int. Cl.
*B64C 23/06* (2006.01)
*B64C 7/00* (2006.01)
*B64C 21/02* (2006.01)

(52) U.S. Cl.
CPC ............. *B64C 23/06* (2013.01); *B64C 7/00* (2013.01); *B64C 21/02* (2013.01)

(58) Field of Classification Search
CPC .. B64C 1/00; B64C 7/00; B64C 21/00; B64C 21/02; B64C 23/00; B64C 23/06
(Continued)

(56) References Cited

U.S. PATENT DOCUMENTS 3,525,486 A    8/1970   Wimpenny
3,934,846 A *  1/1976   Maurer ................... B64D 1/04
                                              244/130

(Continued)

FOREIGN PATENT DOCUMENTS

| EP | 2253539 A2 | 11/2010 |
| EP | 2595880 A1 | 5/2013 |
| GB | 2038995 A  | 7/1980 |

OTHER PUBLICATIONS

Dennis Tesch, "Next-Generation 737 Fuel Performance Improvement", Boeing's Aero Quarterly Magazine, 6 pages, WWW.boeing.com/BoeingEdge/aeromagazine.
(Continued)

*Primary Examiner* — Brady W Frazier

(57) ABSTRACT

A fairing assembly is provided about a duct outlet port, which is not parallel to an exterior surface of a vehicle, so as to turn fluid flow exiting the duct outlet port in a direction of surface fluid flow. The fairing assembly includes an upstream vane fairing to orient the surface flow with the angled duct flow, a downstream Coanda fairing to turn transverse duct flow in the direction of the surface flow, and a pair of vortex generators each of which is positioned at an opposing lateral side of the Coanda fairing and angled towards each other to organize the combined fluid flow downstream of the duct outlet port to thereby minimize recirculation. This fairing assembly about the duct outlet port enhances organized mixing of the duct and surface (Continued)

flows, and thereby reduces duct and surface recirculation, duct restriction, and overall vehicle drag.

22 Claims, 12 Drawing Sheets

(58) Field of Classification Search
USPC .................................................... 244/200.1
See application file for complete search history.

(56) References Cited

U.S. PATENT DOCUMENTS

| | | | | |
|---|---|---|---|---|
| 4,447,028 A * | 5/1984 | Wang | ..................... | B64C 9/00 |
| | | | | 244/215 |
| 5,209,434 A | 5/1993 | Presti | | |
| 6,767,261 B1 | 7/2004 | Woodall et al. | | |
| 8,152,109 B2 * | 4/2012 | Silich | ..................... | B64C 15/14 |
| | | | | 244/199.4 |
| 8,382,043 B1 * | 2/2013 | Raghu | ..................... | F15D 1/008 |
| | | | | 244/1 N |
| 8,485,476 B2 * | 7/2013 | Zha | ..................... | B64C 21/025 |
| | | | | 244/36 |
| 2009/0108141 A1 | 4/2009 | Shmilovich | | |
| 2012/0091266 A1 * | 4/2012 | Whalen | ..................... | B64C 5/06 |
| | | | | 137/1 |
| 2016/0052621 A1 * | 2/2016 | Ireland | ..................... | F04D 29/681 |
| | | | | 137/13 |
| 2016/0280358 A1 * | 9/2016 | Lin | ..................... | B64C 23/06 |

OTHER PUBLICATIONS

International Search Report & Written Opinion as received in PCT/US2018/065452 dated Mar. 6, 2019.
International Preliminary Report on Patentability as received in PCT/US2018/065452 dated Jun. 30, 2020.

* cited by examiner

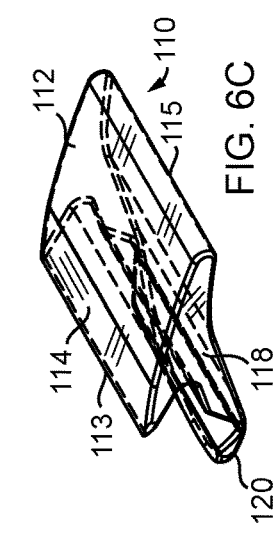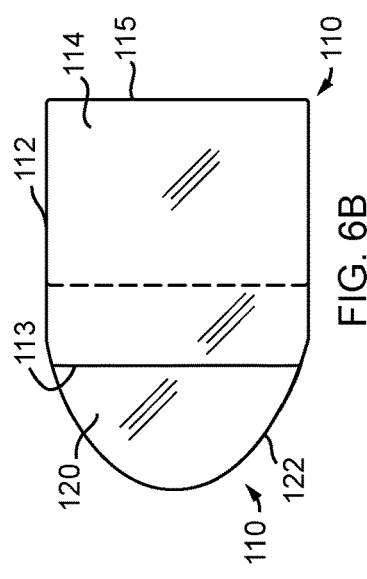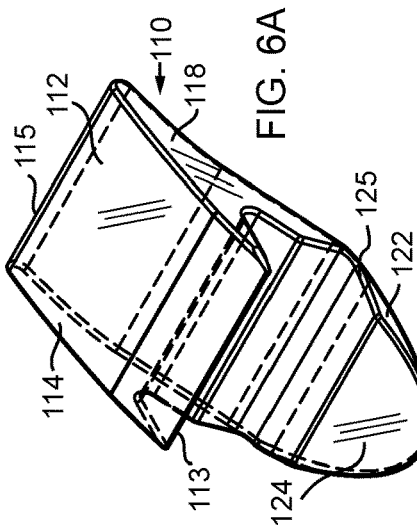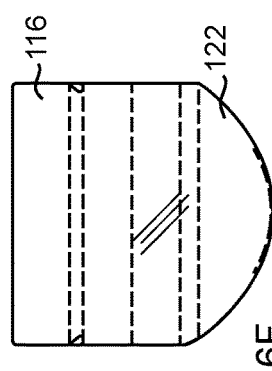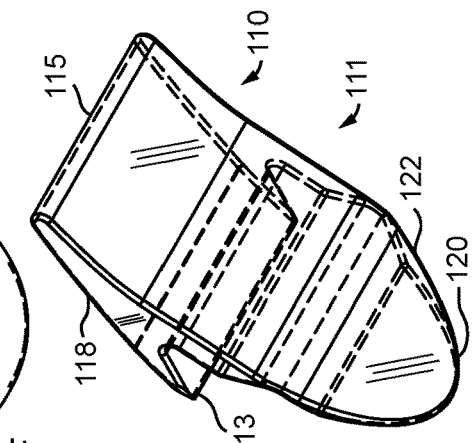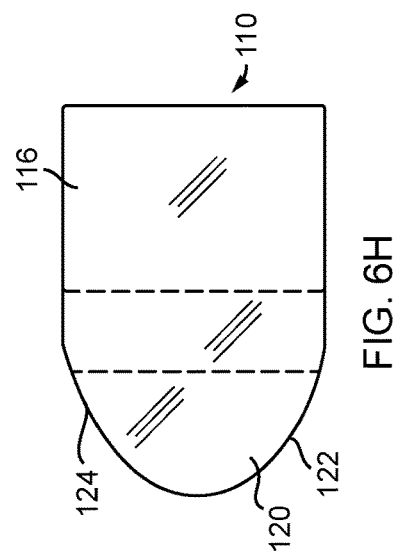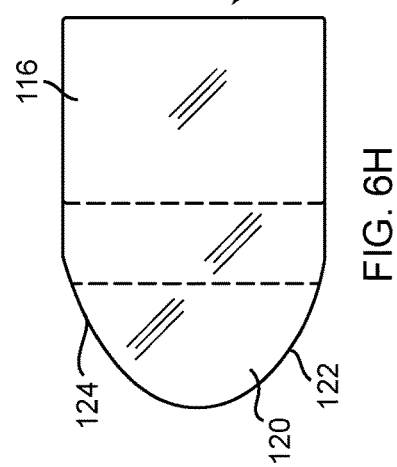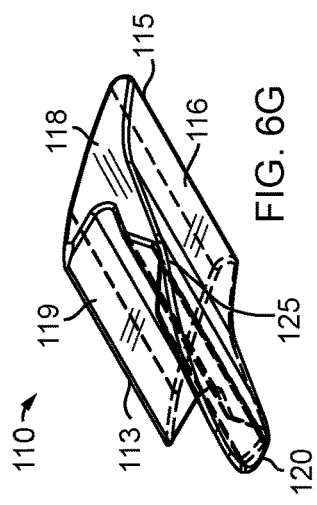

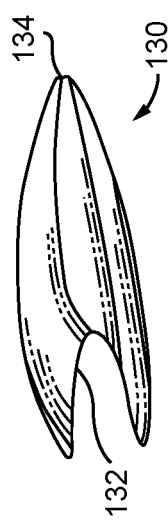
FIG. 7A
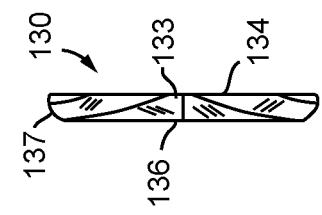
FIG. 7F
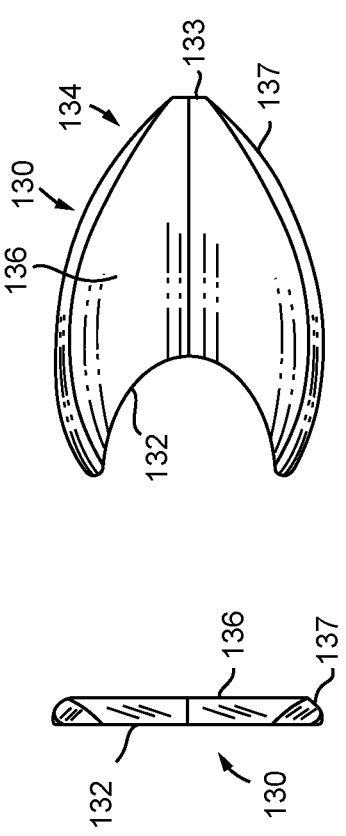
FIG. 7B
FIG. 7C
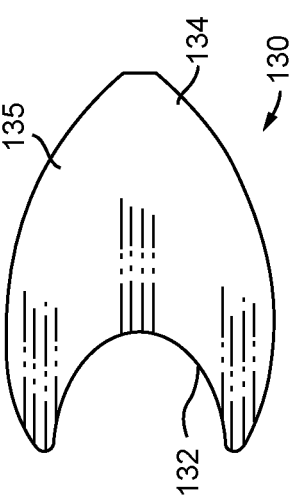
FIG. 7D
FIG. 7E

APPARATUS FOR REDUCING DRAG OF A TRANSVERSE DUCT EXIT FLOW

CROSS REFERENCE TO RELATED APPLICATION

This application claims benefit under 35 U.S.C. § 371 to international application No. PCT/US2018/065452 filed on Dec. 13, 2018, which claims priority to U.S. Provisional Application No. 62/611,143 filed on Dec. 28, 2017, the contents of which are incorporated by reference in their entireties.

FIELD OF INVENTION

The invention relates to aircraft fairings, and more specifically to a fairing assembly positioned about a duct outlet port of an aircraft or other vehicle.

BACKGROUND OF INVENTION

Fluid duct outlet ports on aircraft and other types of vehicles are often subject to design compromises which prevent their orientation parallel, or nearly parallel to a surface from which they are formed. A nearly parallel orientation is optimum, as illustratively shown by distributed propulsion jets in U.S. Pat. No. 6,767,261. More specifically, when the fluid duct outlet ports are close to having parallel orientation with respect to the surface from which they extend, thrust is maximized while drag is minimized by energizing fluid surface flow with the duct flow, or by allowing low velocity duct flow to mix with high velocity surface flow with minimum drag.

Fluid ducts that are not directly used for propulsion can include cooling, exhaust, waste effluent, and other well-known fluid outlets. When the fluid duct outlet is oriented within ten degrees with respect to the surface fluid flow, the additional drag of the duct flow is minimal and mainly independent of the ratio of duct outlet flow to surface fluid flow velocities. This ratio is known as the "relative velocity" of the duct. However, vehicle structural or other considerations often force duct outlets to be oriented at higher angles with respect to the surface flow.

For duct outlet angles generally exceeding ten degrees, a high relative duct fluid velocity versus surface fluid velocity will lead to the duct flow departing the surface of the aircraft and disrupting the flow in front of, around, and behind the duct outlet. This causes recirculation of the surface and duct flows, which often leads to fluid dynamic drag and noise.

To turn the angled duct outlet flow along a surface that is not parallel to the duct, a variety of prior art devices have been used with varying results. Duct relative velocity may vary widely over different operating conditions. Accordingly, it is desirable that any such device should be effective where a high duct relative velocity and a high duct outlet angle occurs, while also having minimal impact on the surface flow drag at low duct relative velocity.

As well, angled ducts with propulsion effects can also trade off drag for the mechanical simplicity of a higher than optimum duct angle, where thrust would be decreased while drag and noise would be increased. Accordingly, it is desirable to provide a simple way of turning the propulsion duct flow parallel with the surface flow that decreases duct restriction, increases thrust, and reduces drag and noise.

The use of the Coanda effect to turn airflow has been in wide use for many years. The Coanda effect allows a fluid flow to follow a curved surface, such as on the flaps of a wing, as illustratively disclosed in U.S. Pat. No. 4,447,028. A fairing implementing the Coanda effect may be placed immediately downstream of a highly angled outlet duct. A Coanda fairing may be successfully used on slightly angled ducts with high duct relative velocities and at greater angles if the duct relative velocity is low. Turning a highly angled flow at high relative velocity from an outlet duct with only a Coanda fairing is not possible in less than three duct diameters of length and a profile height of less than one-half (0.5) of a duct diameter. To be effective, the leading edge of the Coanda fairing is parallel to the duct outlet and turns to attach the duct flow to the surface at less than a 15 degree angle to the surface.

The use of vortex generators to circulate organized flow to reduce or eliminate areas of recirculation is also well-known in the art for controlling a flow of a fluid. Highly angled fluid flow from a duct outlet creates large areas of recirculation that generally requires very large vortex generators to organize the flow. Such large vortex generators can induce significant drag and noise, thereby negating the benefits of organizing the recirculation.

Referring now to the prior art drawings of FIGS. 1-3, air turbulence is illustratively shown about and within an angled outlet duct port at the surface of an aircraft. The aircraft 10 includes a high angled duct 20 (e.g., greater than 10 degrees) having a duct outlet port 22 formed at an exterior surface 12 of the aircraft 10 and the angled duct 20 intersects and terminating at the exterior surface 12 at an outlet port 22. In the prior art FIGS. 1-3, the fore and aft ends of the aircraft are on the left and right sides of the drawing, respectively. Accordingly, the aircraft flies towards the left and the air flowing at the surface of the aircraft is in a direction of left to right, as illustratively shown by arrow "A" in FIG. 3, where the duct 20 and outlet 22 are illustratively shown on a bottom portion of the aircraft). The duct 20 is angled from the forward to aft direction to help minimize the turbulence of fluid from the duct outlet port when combining with the surface air flow. The angling (e.g., forty degrees) of the duct 20 and its outlet port 22 are a matter of design choice that is often determined by nearby or adjacently positioned structures of the aircraft.

For example, the duct conduit 20 which terminates at the outlet port 22 can often have protuberances, bends, obstructions, and other structural restrictions 30 therein which can cause significant fluid flow disturbances 32 in the duct flow. Some of these structural restrictions 30 can create fluid recirculation 32 within the duct 20, which often leads to back pressure and restriction of the duct flow. It has also been observed that the greater the angle of the duct outlet 22 to the corresponding vehicle surface 12, the more recirculation 32 in the duct 20 will be caused by the surface flow, thereby leading to greater duct flow restriction.

To address the undesirable recirculation effect, it is known to install a series of angled vanes at the duct outlet 22 to organize the fluid flow and steer it towards the surface axis. However, the angled vanes can also cause duct flow restriction, as well as surface drag when the duct has minimal or no fluid flow. If the duct outlet 22 has originally been designed without vanes, the additional restriction of adding vanes can compromise the performance of any fluid flow system that depends on the as-designed duct efficiency. Therefore, there is a need to better control fluid flow from and at the surface boundary layer of many common outlet ducts 22.

U.S. Pat. No. 3,525,486 discloses a placement of a vortex generator inside a duct to assist with turning the flow to the surface axis. This creates unacceptable restriction to the duct flow for many applications.

In view of the aforementioned and other deficiencies in the prior art, it is desirable to provide a fluid flow duct outlet apparatus such as an assembly of fairings and vanes about an existing duct outlet port and its surrounding surface areas, which creates an effect not possible by the use of these devices individually.

SUMMARY OF THE INVENTION

The above disadvantages and deficiencies in the prior art are avoided and/or solved by various embodiments of an angled duct outlet fairing assembly for reducing drag of a duct outlet port of an angled duct in an aircraft or other vehicle comprising: a vane fairing having a upwardly sloped ramp portion that includes a leading edge mounted forward a leading edge of the duct outlet port, the ramp portion extending rearwardly and upwardly over a portion of the duct outlet port, the ramp being aligned in a direction of a longitudinal axis of the vehicle; a Coanda fairing having an elongated body with a leading edge circumscribing a trailing edge of the duct outlet port, the elongated body having a predetermined height, width and extending rearwardly a predetermined length based on a dimension of the duct outlet port; and a pair of vortex generators positioned rearwardly of the duct outlet port, each vortex generator being positioned on an opposing lateral side of the Coanda fairing and angled towards each other.

In one embodiment, the ramp portion of the vane fairing has a curved upper surface to direct surface air flow along an exterior surface of the aircraft at an upwardly sloped angle away from the duct outlet port. In another aspect, the ramp portion of the vane fairing has a curved lower surface to direct or turn duct fluid flow exiting the duct outlet port in a direction towards the Coanda fairing. In yet another aspect, the ramp portion of the vane fairing has a predetermined length based on the dimension of the duct outlet port. In still another aspect, the ramp portion has a length as measured between its leading edge and trailing edge of 0.5 to 0.9 diameters of the duct outlet port. In a further aspect, the ramp portion of the vane fairing has a predetermined height as measured from the surface of the aircraft based on one-half of duct angle and the length of the ramp portion.

In another embodiment, the ramp further includes a tongue portion that extends downwardly into the angled duct. In one aspect, the tongue portion is configured to and extends a distance that is sufficient to cover a structural obstruction within the angled duct.

In still another embodiment, the Coanda fairing is substantially triangular in shape. In one aspect, the Coanda fairing has a height in a range of 0.15 to 0.25 diameters of the duct outlet port per forty-five degrees of duct angle. In another aspect, the Coanda fairing has a height of 0.2 diameters of the duct outlet port per forty-five degrees of duct angle. In yet another aspect, the Coanda fairing has a length in a range of 1.5 to 3.0 diameters of the duct outlet port per forty-five degrees of duct angle. In another aspect, the Coanda fairing has a length of 3.0 diameters of the duct outlet port per forty-five degrees of duct angle.

In yet another embodiment, each of the pair of vortex generators extends substantially perpendicular from an exterior surface of the vehicle. In one aspect, the pair of vortex generators are positioned aft of the duct within two duct diameters. In another aspect, each of the pair of vortex generators are angled between fifteen and thirty degrees to a centerline of the duct outlet port to thereby generate counter rotating vortices which converge behind the Coanda fairing. In still another aspect, each of the pair of vortex generators includes a base which is mounted to an exterior surface of the vehicle and a dorsal member which extends outwardly and substantially perpendicular from the base. In another embodiment, the dorsal member of the pair of vortex has a curved leading edge.

BRIEF DESCRIPTION OF THE DRAWINGS

FIGS. 6A-6I depict various views of the forward vane fairing of the duct outlet port fairing assembly of FIG. 4;

FIGS. 7A-7F depict various views of the Coanda fairing of the duct outlet port fairing assembly of FIG. 4;

Figure 1:
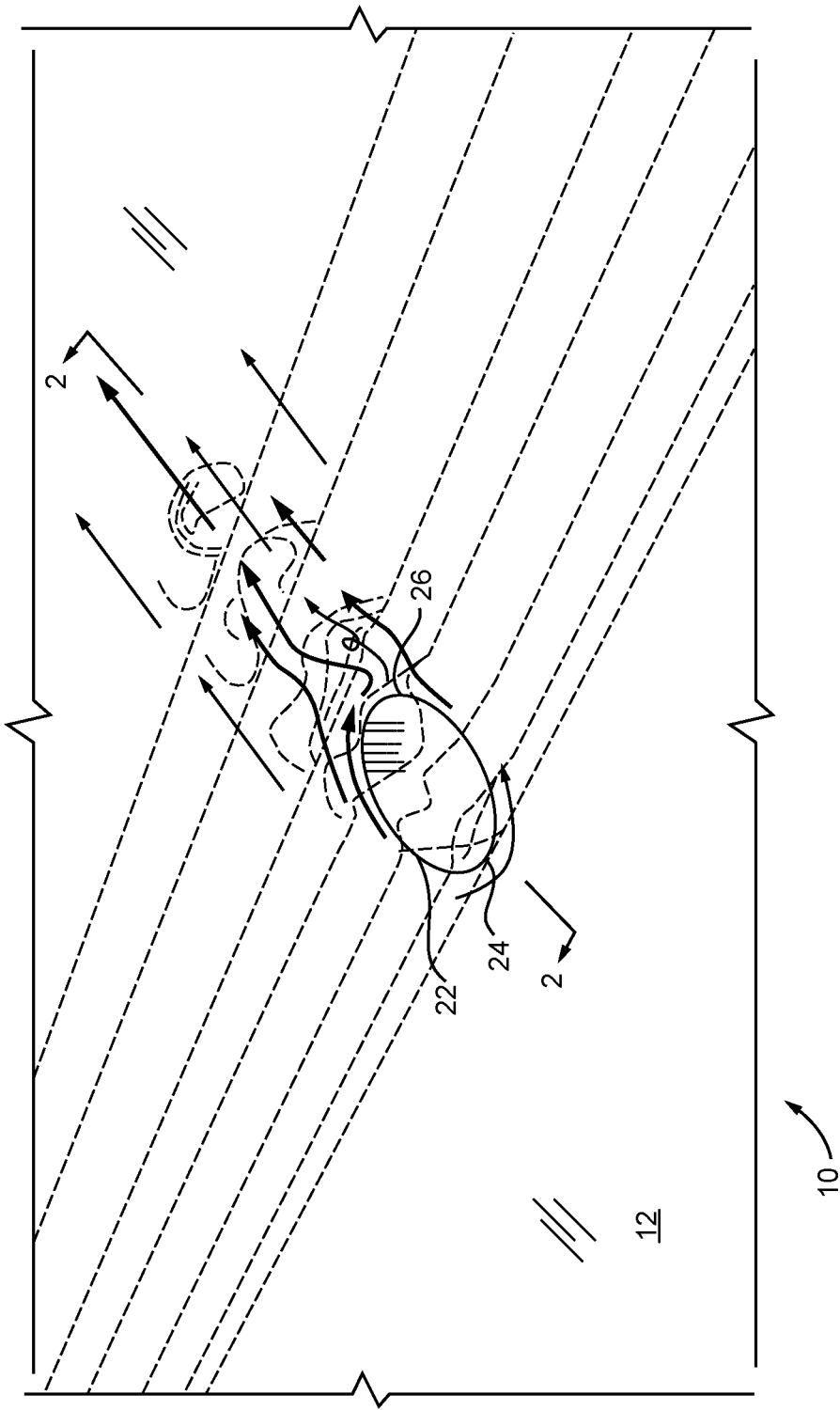
FIG. 1 is a prior art forward perspective view of an exterior portion of an aircraft having an angled duct terminating at a duct outlet port and illustrating turbulent duct flow and surface air flow proximate the duct outlet port.

To further facilitate an understanding of the invention, the same reference numerals have been used, when appropriate, to designate the same or similar elements that are common to the figures. Further, unless otherwise indicated, the features shown in the figures are not drawn to scale, but are shown for illustrative purposes only.

DETAILED DESCRIPTION OF THE EMBODIMENTS

The present invention is directed to a fairing assembly which is positioned about an angled duct outlet port of an aircraft or other vehicle in a manner that is not parallel to an exterior surface of the aircraft and in order to control the fluid flow exiting the duct outlet port. More specifically, the fairing assembly of the present invention turns the fluid flow exiting the duct outlet port in a direction of the surface flow over the exterior surface of the aircraft with minimized recirculation and drag. The fairing assembly includes an upstream vane to orient the surface flow with the duct flow, a downstream Coanda fairing to aid in turning the transverse duct flow in the direction of the surface flow, and a pair of vortex generators each of which is positioned at an opposing lateral side of the Coanda fairing and angled towards each other and angled towards each other to organize the combined resultant flow downstream of the duct outlet port with minimal recirculation, duct restriction, and overall vehicle drag. The fairing assembly of the present invention produces a more organized mixing of the duct and surface flows than any one of the fairing components can achieve individually.

Figure 4:
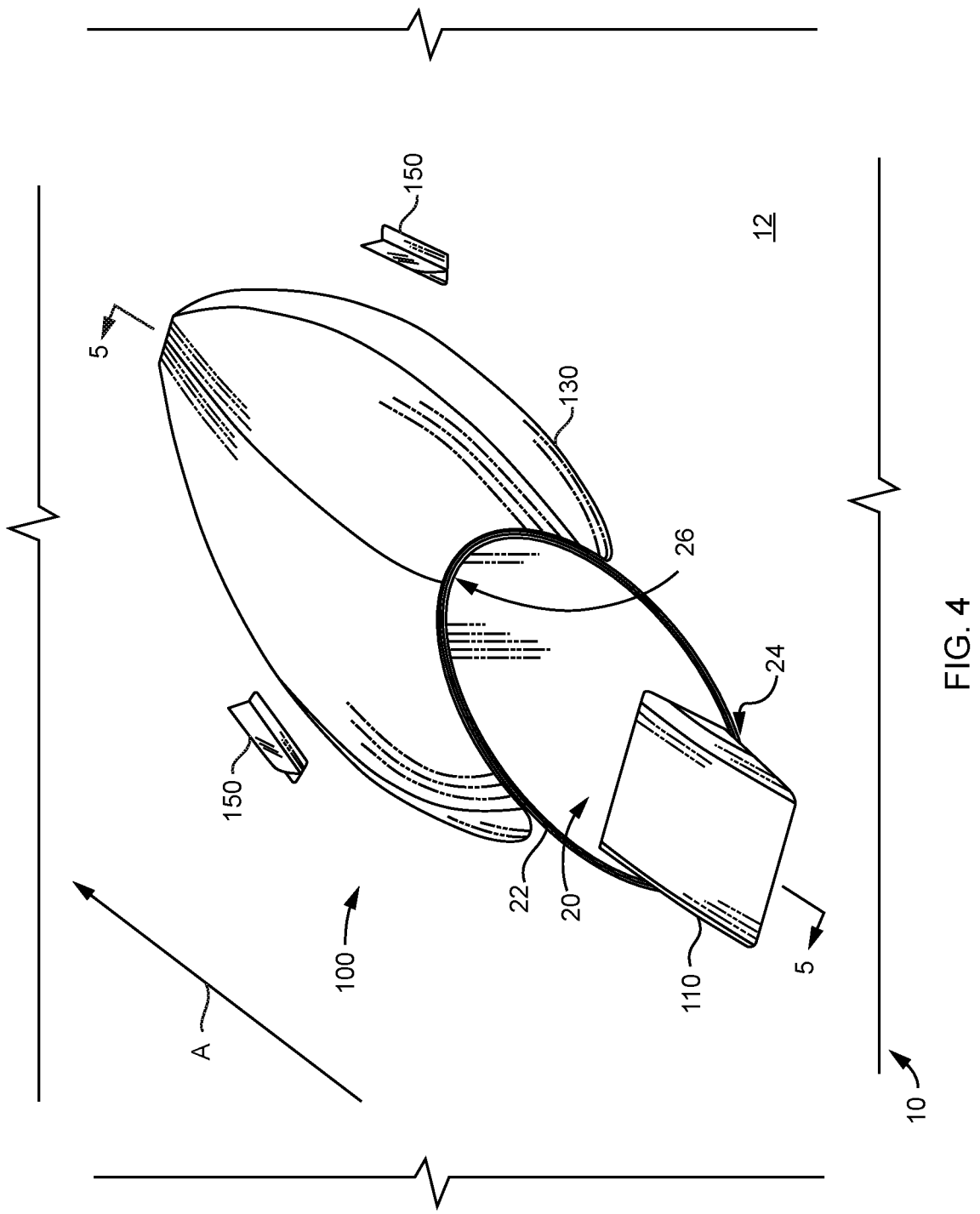
FIG. 4 is a forward perspective view of a duet outlet port fairing assembly of the present invention having a forward vane fairing, a Coanda fairing and a pair of vortex generator fairing which are arranged and mounted about an angled duct outlet port of an aircraft.
Figure 5:
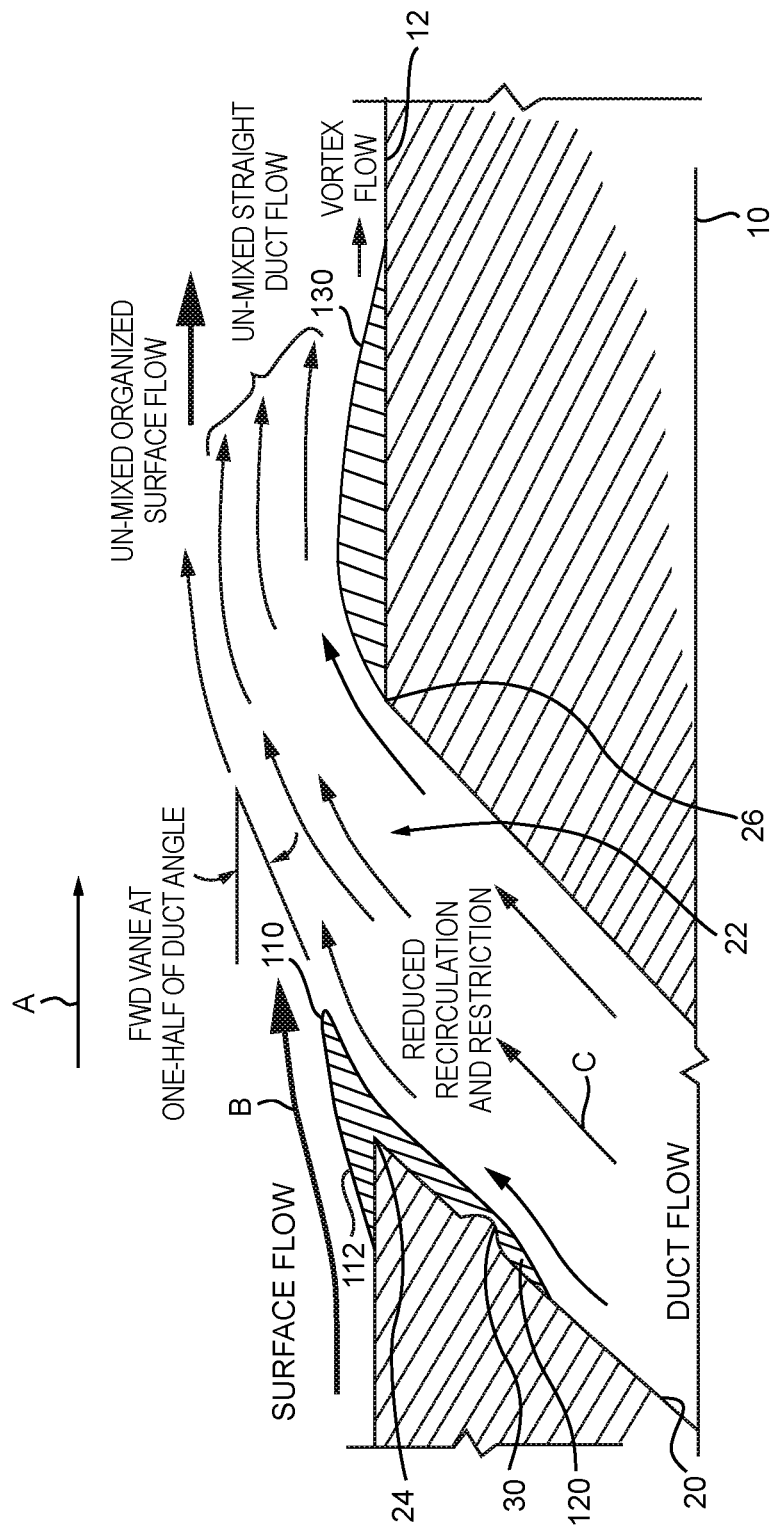
FIG. 5 is a cross-sectional view of the duct outlet port and the duct outlet port fairing assembly taken along lines 5-5 of FIG. 4 and illustrating a reduction of airflow turbulence within and about the duct outlet port.

Referring to FIGS. 4 and 5, the present invention relates to a duct outlet port fairing assembly 100 for positioning about a duct outlet port 22 of an aircraft 10 to help minimize turbulence and drag which is typically observed at prior art duct outlet ports. The drawings illustratively depict an embodiment of having a circular, nine inch diameter exhaust duct which is angled forty degrees to the exterior surface of the aircraft or vehicle. The forward vane fairing illustratively includes an optional structural feature to smoothly fair out a design flaw or structural impediment within the duct. Specifically, the vane fairing has a member that extends over a portion of the duct outlet, as well as inside the duct to "fill in" the downstream side of a structural relief protrusion. An illustrative forward vane fairing that specifically addresses this structural relief issue is shown and discussed below with respect to FIGS. 4, 5 and the other supporting images.

More specifically, the fairing assembly 100 includes a vane fairing 110 positioned at a leading edge 24 of the duct outlet port 22, a Coanda fairing 130 positioned at a rear or trailing duct edge of the duct outlet port 22, and at least one vortex generator vane 150 positioned laterally to the Coanda fairing 130. The arrangement of the forward vane fairing 110, the Coanda effect fairing 130 and the vortex generator(s) 150 collectively alter the direction of a fluid flow exiting the duct outlet port 22 at an exterior surface 12 of an aircraft 10 to better coincide with the direction and angle of fluid flow over the exterior surface 12 of the aircraft thereover.

Although the invention is described in terms of an aircraft duct 20 which serves as a conduit to channel a flow of air or other fluids for release into the atmosphere or external environment via an outlet or port 22 formed on the exterior surface 12 of the aircraft, such type of transport vehicle is not considered limiting, as the fairing assembly 100 can be implemented on other types of vehicles where altering the direction of fluid flow exiting a duct outlet is desirable. For example, the fairing assembly 100 can be implemented on ships, vessels, among other vehicles or duct outlet port and exterior surface interfaces where it is desirable to change the direction of flow of a fluid from the duct outlet with respect to the exterior surface.

Further, the fairing assembly 100 is shown and described with use with a transverse circular duct 22 having a nine inch diameter and orientated at a forty degree angle to a surface 12. This duct 20 is typical to a large aircraft which is often used as the heat exchanger outlet for the passenger cabin pressurization system. A person of ordinary skill in the art will appreciate that the use, size and angle of the duct relative to the surface of the vehicle is not considered limiting, as the fairing assembly 100 of the present invention can be configured to accommodate any size duct outlet on an exterior surface.

Referring now to FIGS. 4, 5 and 6A-6I, the forward vane fairing 110 is positioned proximate the leading edge 24 of the duct outlet port 22. The forward vane 110 includes an upper ramp portion 112 and an optional lower tongue portion 120, the latter of which is discussed below in further detail. The ramp portion 112 has a curved upper surface 114 with a leading edge 113 adjoined to the surface 12 of the aircraft forward of the leading edge of the duct outlet port 22, and a raised (upwardly sloped) trailing edge 115 to direct the surface air flow along the exterior surface of the aircraft at an upwardly sloped angle away from the duct outlet port 22. The ramp portion 112 also has a curved lower surface 116 to direct or turn the duct fluid flow in a direction towards the Coanda fairing 130 at the trailing edge 26 of the outlet port 22. The upper surface 114 is preferably convex in shape and the lower surface 116 of the ramp portion 112 is preferably concave in shape to direct and turn the surface air flow and duct air flow, respectively.

The ramp portion 112 of the vane fairing 110 has a predetermined length based on the dimension of the duct outlet port. In particular, the length of the ramp portion, as measured linearly between the leading and trailing edges of the ramp portion, is in a range between 0.5 and 0.9 duct outlet port diameters, and preferably 0.7 duct outlet port diameters. Moreover, the maximum height proximate or at the trailing edge 115 of the ramp portion 112, as measured from the surface plane 12 of the aircraft is determined by the length of the ramp portion 110 and one-half of the duct angle. For example, a nine inch duct 20 having an angle of forty degrees and a length of 0.7 diameters would have height of 2.1 inches [(sine (0.5)(40 degrees)](9 in.)(0.7 diameters).

Referring to the cross-sectional view of FIG. 5, the upper surface 114 and lower surface 116 extend partially over the outlet duct 22 such that the air surface flowing at the leading edge 24 of the outlet duct will follow along the curved upper surface 114 of the ramp portion 112, as shown by arrow "B". Moreover, the duct flow (arrow "C") at the leading edge 24 of the duct outlet 22 is also turned towards the Coanda fairing 130 by the lower surface 116 of the ramp 112. The surface flow and duct flow respectively passing over the upper surface 114 and lower surface 116 of the ramp 112 mixes and collectively flows over the Coanda fairing 130, which in turn redirects, i.e., turns the resultant mixed fluid flow back towards and along the exterior surface 12 of the aircraft 10, thereby reducing turbulence and drag proximate the duct outlet port 22.

The forward vane fairing 110 positioned at the leading edge 24 of the duct 20 preferably bisects the angle of the duct 20 and the surface 12 within ten (10) degrees of the angle of bisection, and extends less than one-half (0.5) diameters of duct outlet 22 length aft from the leading edge 24 of the duct outlet port 22. For example, a nine inch duct output port of a forty degree angled duct 20 would be positioned at an angle between ten and thirty degrees (e.g., preferably approximately twenty degrees) with respect to the surface 12, and extend less than 4.5 inches over the duct outlet port 22. In one embodiment, the ramp portion 112 of the forward vane fairing 110 covers between forty to ninety percent (40% to 90%) of the duct outlet's leading edge portion width, although such range is not considered limiting. For example, the coverage over the leading edge width can be plus or minus ten percent (10%).

The lower surface 116 of the ramp portion 112 is a smooth curve extending parallel from the duct surface upwardly towards the trailing edge 115. In one embodiment, the lower surface 116 is a spline, although such shape is not considered limiting. The upper surface 114 has a curvature at its forward leading portion of ½ of the duct angle, and a curvature at its rear trailing portion of ¼ of the duct angle.

Figure 2:
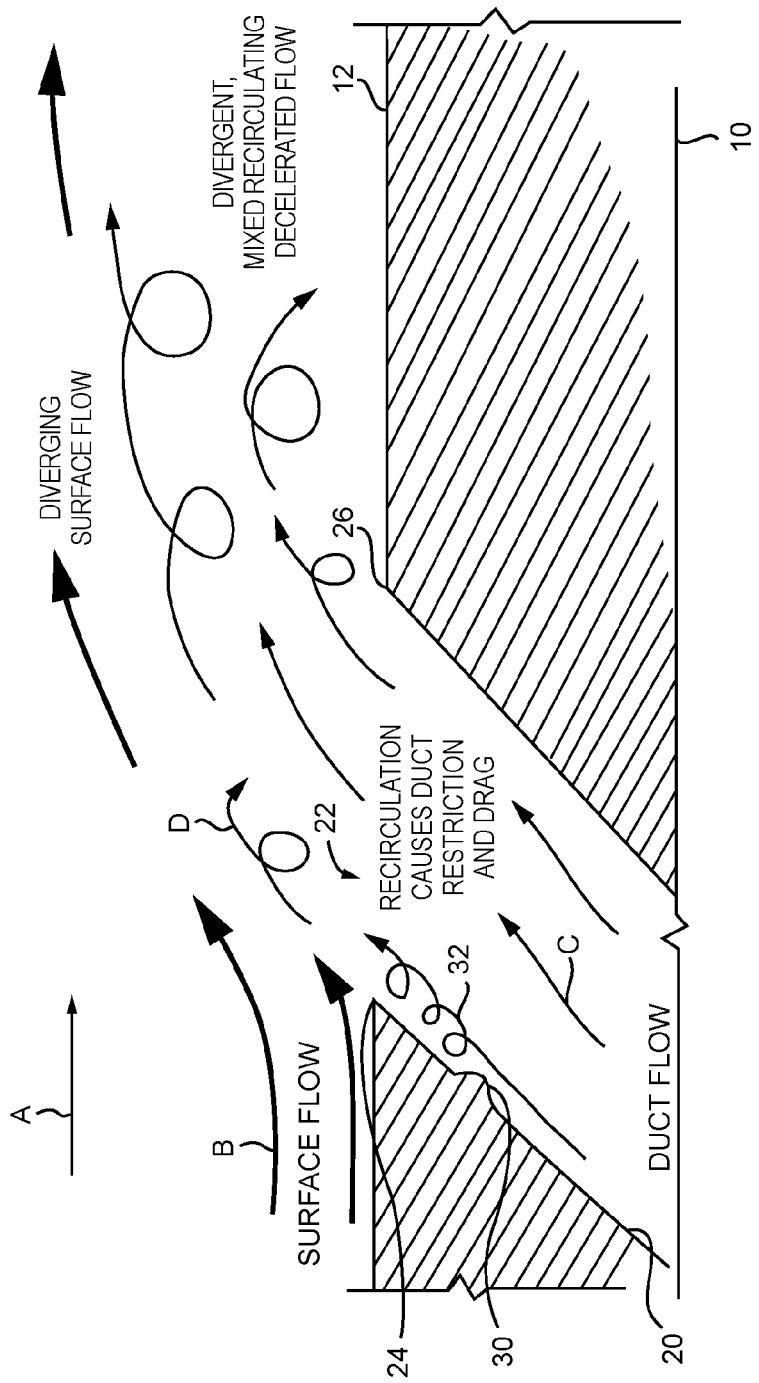
FIG. 2 is a prior art, cross-sectional view of the angled duct and duct outlet port of FIG. 1 illustrating turbulent air flow within and around the duct outlet port of the aircraft.

Referring to FIG. 2, the duct fluid flow shown by arrow "C" exiting out of the outlet port 22 collides or otherwise intermixes with the air flow over the surface 12 of the aircraft 10, as shown by arrow B. The flow from the duct C causes the surface air flow to diverge away from the exterior surface 12 of the aircraft 10 where the outlet port 22 is formed, and/or recirculate (arrow "D"), thereby resulting in a combined or mixed airflow from duct flow and surface flow that is divergent, recirculating and decelerating, thereby increasing drag aft of the outlet duct 22. By comparison, referring to FIG. 5, the ramp portion 112 turns the duct flow C to reduce the angle that the flow exits the duct 22 and intermixes with the surface flow B, thereby reducing drag behind the outlet duct 22.

As discussed above with respect to FIG. 2, the duct conduit 20 which terminates at the outlet port 22 can often have protuberances, bends, obstructions, and other structural restrictions 30 therein, which can cause significant fluid flow disturbances 32 in the duct flow. Some of these structural restrictions 30 can create fluid recirculation 32 within the duct 20, which often leads to back pressure and restriction of the duct flow.

In another embodiment, the forward vane fairing 110 includes a tongue portion 120 extending from the lower surface of the ramp portion 112, as illustratively shown in FIGS. 6A-6I. Referring to FIGS. 6A and 6I, a top, rear right-side perspective view and a bottom, front right-side perspective view of the forward vane fairing 110 are respectively shown. FIG. 6E is a right side elevational view of the right side 118 of the forward vane fairing 110. FIG. 6C is a top, front, right-side view thereof and FIG. 6G is a bottom, rear, right-side view thereof. FIGS. 6B and 6H are respectively a top plan view and a bottom view of the forward vane fairing 110. FIGS. 6D and 6F are left side and right side views of the right side elevational view of FIG. 6E, respectively.

Referring again to FIG. 2, an obstruction 30 is shown extending within the duct 20, which is causing recirculation and duct flow restrictions, i.e., drag within the duct 20. To address and solve for the recirculation/drag problem caused by the obstruction 30, the tongue portion 120 of the forward vane fairing 110 is inserted into the duct 20 and extends a distance suitable to cover over the obstruction 30, thereby minimizing or negating the undesired flow recirculation effects caused by the obstruction 30.

Referring now to FIGS. 6A-6I, the tongue portion 120 includes a curved lower surface 122 which illustratively conforms with the inner surface of the duct 20. Although the duct 20 is discussed as having a predominately circular or curved interior surface, such shape is not considered limiting and the tongue portion 120 is preferably configured to conform to the interior surface of the duct 20. The curved lower surface 122 of the tongue 120 extends in a direction towards and is integral with the lower surface 116 of the ramp portion 112 to form an underside surface 111 of the forward vane fairing 110. An upper surface 124 of the tongue 120 includes a notch or cutout 125 which conforms to fit around the obstruction 30, as illustratively shown in FIG. 5.

The forward vane fairing 110 is positioned over the duct outlet port 22 such that the leading edge 113 (FIG. 6A) is positioned forward of the duct outlet port 22 and the raised trailing edge 115 extends over the duct outlet port 22. An underside 119 (FIG. 6E) of the ramp portion 112 is shaped to conform to the exterior surface 12 upon which it is mounted. Similarly, the upper surface 124 of the tongue 120 also conforms to the shape of the interior surface of the duct 20 and the obstruction 30.

The forward vane fairing 110 described and shown herein is suitable for duct angles greater than twenty degrees and less than 90 degrees to the surface 12 at which the duct outlet port is positioned. Preferably, the maximum duct relative velocity is between two times the surface flow at a twenty degree duct angle and one-half the surface flow at a 90 degree duct angle during at least twenty percent of the operation of the vehicle, although such duct velocities and angle values are not considered limiting.

Referring now to FIGS. 4, 5 and 7A-7F, the Coanda fairing 130 is illustratively shown. The Coanda fairing 130 is somewhat triangular or deltoid in shape and is positioned and extends rearward from the trailing edge 26 of the duct outlet port 22. More specifically, the Coanda fairing 130 is mounted on the surface 12 of the fuselage downstream of the duct outlet port 22 with its leading edge 132 located at the trailing edge 26 of the duct outlet port 22. The length of the Coanda fairing 130 is preferably less than three times the diameter of the duct outlet port 22, although such length is not considered limiting.

Referring now to FIGS. 7A-7F, the Coanda fairing 130 includes a leading edge 132, a trailing edge 134, a bottom 135, and a top surface 136. The bottom 135 can be solid or formed as a cavity when mounted over the exterior surface 12 of the aircraft 10. The leading edge 132 of the Coanda fairing 130 conforms to the downstream half of the duct outlet port 22, preferably with an initial transition surface angle of the duct exit angle within +/− five (5) degrees. The leading edge 132 is illustratively shown as circular in shape and circumscribing the shape of the trailing edge 26 of the duct outlet port 22. However, such circular shape is not considered limiting, as the leading edge 132 can be shaped to conform to any other configuration of the duct outlet port 22.

The length of the Coanda fairing 130, as measured longitudinally from the foremost leading edge 132 to the tip of the trailing edge 134, is based on the angle of the duct 20 with respect to the surface 12 of the aircraft 10. In particular, the Coanda fairing 130 preferably has a length of approximately three duct outlet port diameters per forty-five (45) degrees of duct angle. The length of the Coanda fairing "LC" can be expressed mathematically as: LC=(DP*M)/45 degrees, where "DP" is the diameter of the duct outlet port (e.g., inches) and "M" is a multiplier value of three (3), although such multiplier value is not considered limiting. For example, the multiplier M can be in a range of 1.5 to 3.0 duct outlet port diameters and still be operative to minimize recirculation of air flow. Accordingly, the length of the Coanda fairing 130 is longer for duct angles greater than forty-five degrees and shorter for duct angles less than forty-five degrees.

The length of the Coanda fairing 130 can be determined for a differently angled ducts 20 by the equation: LC= (DP*ML)/45=X/DA, where "LC" is the length of the Coanda fairing along its longitudinal direction (e.g., inches), DP is the diameter of the duct outlet port (e.g., inches), ML is the length multiplier (e.g., 1.5-3.0), "DA" is the duct angle, and "X" is the length value being solved for by the equation. Accordingly, the length value of "X"=LC= (DP*ML*DA)/45.

For example, for a nine inch diameter duct and where a length multiplier of three (3) is selected, a duct 20 having a duct angle (DA) of thirty degrees would have a Coanda fairing length of approximately two duct outlet port diameters, i.e., eighteen inches. Similarly, applying the same set of criteria for a duct 20 having a steeper angle of sixty-seven degree, the Coanda fairing length would have a length of approximately 4.5 duct outlet port diameters, i.e., 40.5 inches. As noted above, although the Coanda fairing 130 preferably has a length of approximately three duct outlet port diameters per forty-five (45) degrees of duct angle, such length based on outlet port diameters per forty-five degree angle of the duct 20 is not considered limiting, as the Coanda fairing is operable at a range of 1.5-3.0 duct outlet port diameters per forty-five (45) degrees of duct angle.

The maximum height "HC" of the Coanda fairing 130 is approximately or slightly less than one-fifth (0.20) duct outlet port diameters of height per forty-five degrees of duct angle. Thus, the steeper the duct angle, the greater the height of the Coanda fairing. Conversely, far shallower duct angles, a lesser height is required per 45 degrees. The maximum height of the Coanda fairing for any angled duct 20 can be found by the equation: HC=(DP*MH)/45=X/DA, where "HC" is the height of the Coanda fairing (e.g., inches), DP is the diameter of the duct outlet port (e.g., inches), MH is the height multiplier (e.g., 0.15 to 0.25), "DA" is the duct angle, and "X" is the height value being solved for by the equation. Accordingly, the height value of "X"=HC= (DP*MH*DA)/45.

For example, selecting a height multiplier MH of 0.2 for a duct 20 that is angled forty degrees and having a nine inch diameter duct outlet port 22, the Coanda fairing 130 will have a height of approximately 1.6 inches. Using the same 0.2 height multiplier for a duct 20 having a sixty-five degree duct angle (DA) with a nine inch diameter duct outlet port 22, the Coanda fairing will have a height HC of approximately 2.6 inches.

Referring to FIGS. 4 and 7A-7F, the width of the Coanda fairing 130 at its widest cross-section (normal to the longitudinal axis of the duct output port) can be in a range of 1.5 to a maximum of approximately 3.0 duct diameters in length. The Coanda fairing 130 circumscribes at least a portion (e.g., one-half) of the trailing edge 26 of the duct outlet port 22 and increases in width in a direction towards the trailing edge 134 of the Coanda fairing, with a maximum width located approximately normal to the rearmost portion of the trailing edge with respect to the longitudinal axis of the duct outlet port 22. The width gradually decreases in the direction of the Coanda trailing edge 134 which form an apex of the triangularly shaped Coanda fairing 130. The upper surface 136 of the Coanda fairing 130 preferably terminates at less than 33% of the duct angle at the fairing aft point 133. For example, if the angle of the duct 20 is forty-five degrees, then the trailing edge 134 of the Coanda fairing terminates at 15 degrees.

The height along the upper surface 136 is fairly constant transverse to the longitudinal centerline of the Coanda fairing, as illustratively shown in FIGS. 7E and 7F. The upper surface 136 proximate the periphery or lateral edges of the Coanda fairing increase in tapering 137 to extend downwardly in the direction towards the aircraft surface 12 upon which the Coanda fairing is mounted. The height of the upper surface 136 is fairly constant in the longitudinal direction of the Coanda fairing 130 as shown in FIG. 7C, and gradually curves downwardly in the aft direction to the trailing edge aft point 133, where the tapering increases to the surface 12 of the aircraft 10 in a same manner as along the lateral edges of the Coanda fairing 130.

Figure 8A:
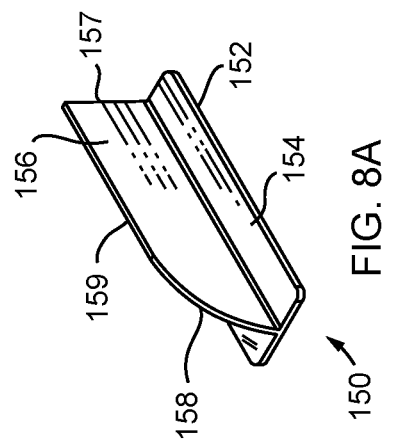
FIGS. 8A-8E depict various views of one of the vortex generator fairings of the duct outlet port fairing assembly of FIG. 4.
Figure 8C:
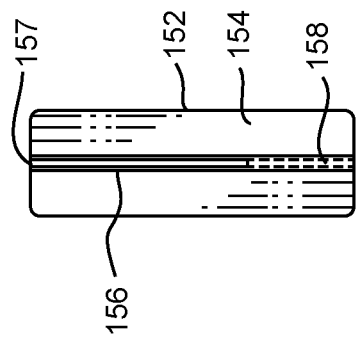
Figure 8D:
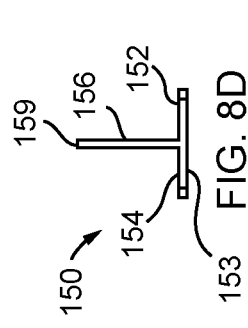
Figure 8E:
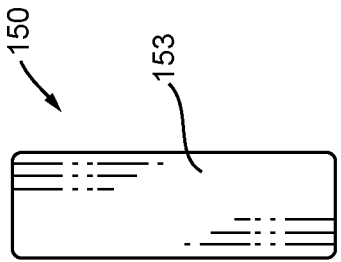
Figure 8B:
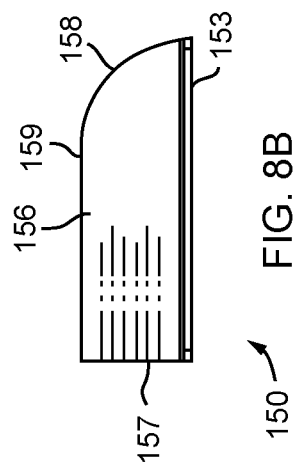

Referring to FIG. 4, the fairing assembly 100 further includes a pair of vortex generators 150 located on the aircraft surface 12, aft of the duct outlet port 22 and located within twenty (20) degrees of parallel to the sides of the Coanda fairing, Each vortex generator 150 is laterally spaced preferably less than one duct diameter from the centerline of the duct outlet port 22. Referring to FIGS. 8A-8E, various views of one of the vortex generator fairings 150 is illustratively shown. FIG. 8A depicts a top, forward perspective view, FIG. 8B depicts a side elevational view, FIG. 8C depicts a top plan view, FIG. 8D depicts a rear elevated view, and FIG. 8E depicts a bottom view of a vortex generator fairing 150. The fairing 150 includes a substantially elongated, planar base 152 having a bottom surface 153 which conforms to the aircraft surface 12 upon which it is mounted, and an upper surface 154 upon which an elongated upright or dorsal member 156 extends perpendicularly upward therefrom, as illustratively shown in FIG. 8D. However, a person of ordinary skill in the art will appreciate that the upright member 156 can be angled, e.g., inwardly in a direction towards the lateral portions of the Coanda fairing 130. The elongated dorsal member 156 is shown having a same longitudinal length as the base 152, although such base length is not considered limiting. The length of each dorsal member 156 of the vortex generators is determined by the optimum aspect ratio of conventional vortex generators at three times the height. For example, a nine inch duct diameter will have a height in a range of 0.90 to 2.7 inches and a respective length in the range of 2.7 to 8.1 inches. The height of the dorsal member 156 of the vortex generators 150 is ten to thirty percent of the duct diameter. Additionally, a leading edge 158 of the dorsal member 156 preferably has a convex shape and curves downwardly from a top edge 159 of the dorsal member 156 to the upper surface 153 of the base 152, although such convex shape is not considered limiting. Preferably, the vortex generators are equipped with a full height radius on the leading edge.

The vortex generators 150 are positioned aft of the duct within two duct diameters. The generators are angled between fifteen (15) and thirty (30) degrees to the duct's longitudinal axis and generate a pair of convergent, counter-rotating vortices which converge behind the Coanda fairing. The purpose of the vortex generators is to create organized vortex flow on each side of the duct outlet port flow to help prevent disorganized recirculation of the freestream and duct flows.

The configurations of the forward vane fairing 110, the Coanda fairing 130, and the vortex generators can be generated by 3D CAD software program (e.g., SolidWorks program by Dassault Systèmes SolidWorks Corp. of Waltham, Mass., USA). A person of ordinary skill in the art will appreciate that any commercially available computer aided design software can generate the fairing profiles from the predetermined dimensions and level of definition. For purposes of better understanding the invention, a computer model of a BOEING 737 aircraft is illustratively used, but such model aircraft is not considered limiting.

Figure 9:
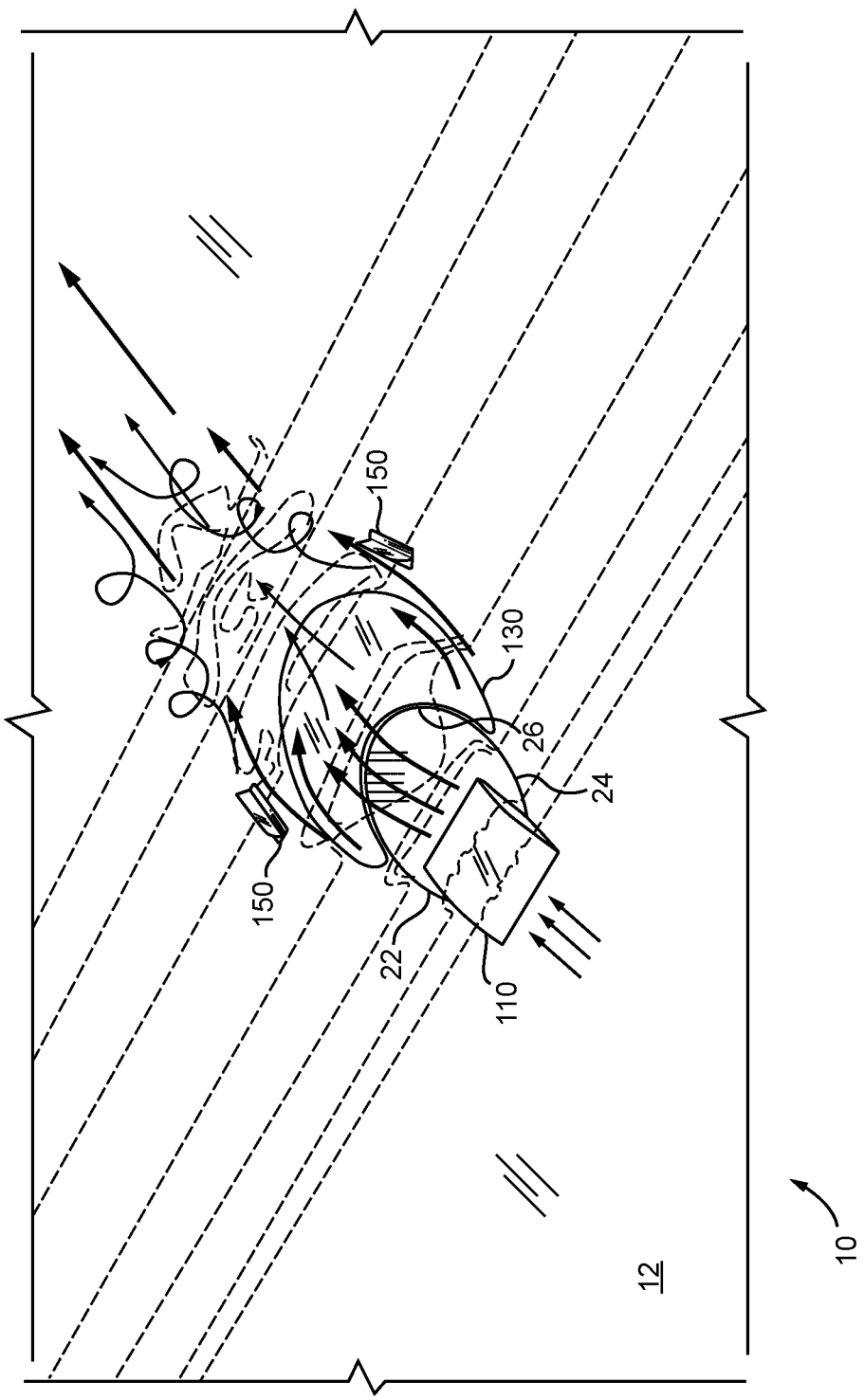
FIG. 9 is a forward perspective view of the outlet port fairing assembly of FIG. 4 mounted about the angled duct and illustrating air flow over the surface of the aircraft proximate the duct outlet port.

Referring again to FIG. 5, the aircraft 10 is shown flying through the air with its duct flow exiting from the duct outlet port 22. The surface air B flows over the ramp portion 112 of the forward vane fairing 110 and is turned slightly upward over the open area of the duct outlet port 22. At the same time, the duct flow C exiting the duct 20 is deflected by the tongue 120 which covers the obstruction 30 in the duct 20 and follows the contour of the underside 116 of the ramp portion 110. The duct flow turns in a rearward direction within the duct with minimal recirculation and restriction caused by the duct obstruction 30. The duct flow C exiting the outlet port 22 intermixes with the surface flow B passing over the ramp 112 with minimal recirculation and the intermixed stream flows over the Coanda fairing 130 such that the resultant fluid stream flow follows the contour of the Coanda fairing 130 and is turned in a direction towards the aircraft surface 12. The resultant stream flow that is lateral to the Coanda fairing 130 is further streamlined rearwardly in a direction of the longitudinal axis of the duct outlet port 22 by the inwardly angled opposing vortex generators 150. Accordingly, turbulence aft, over and rearward of the duct outlet port 22 is minimized, as illustratively shown in FIG. 9. In particular, referring to FIGS. 1 and 9, the broken or dashed lines in FIG. 1 represent "slices" of transverse velocities illustrating highly disorganized flow for the unmodified duct outlet port 22, while FIG. 9 illustrates how the fairing assembly 100 of the present invention provides highly organized flow for the modified duct outlet port 22.

Figure 10:
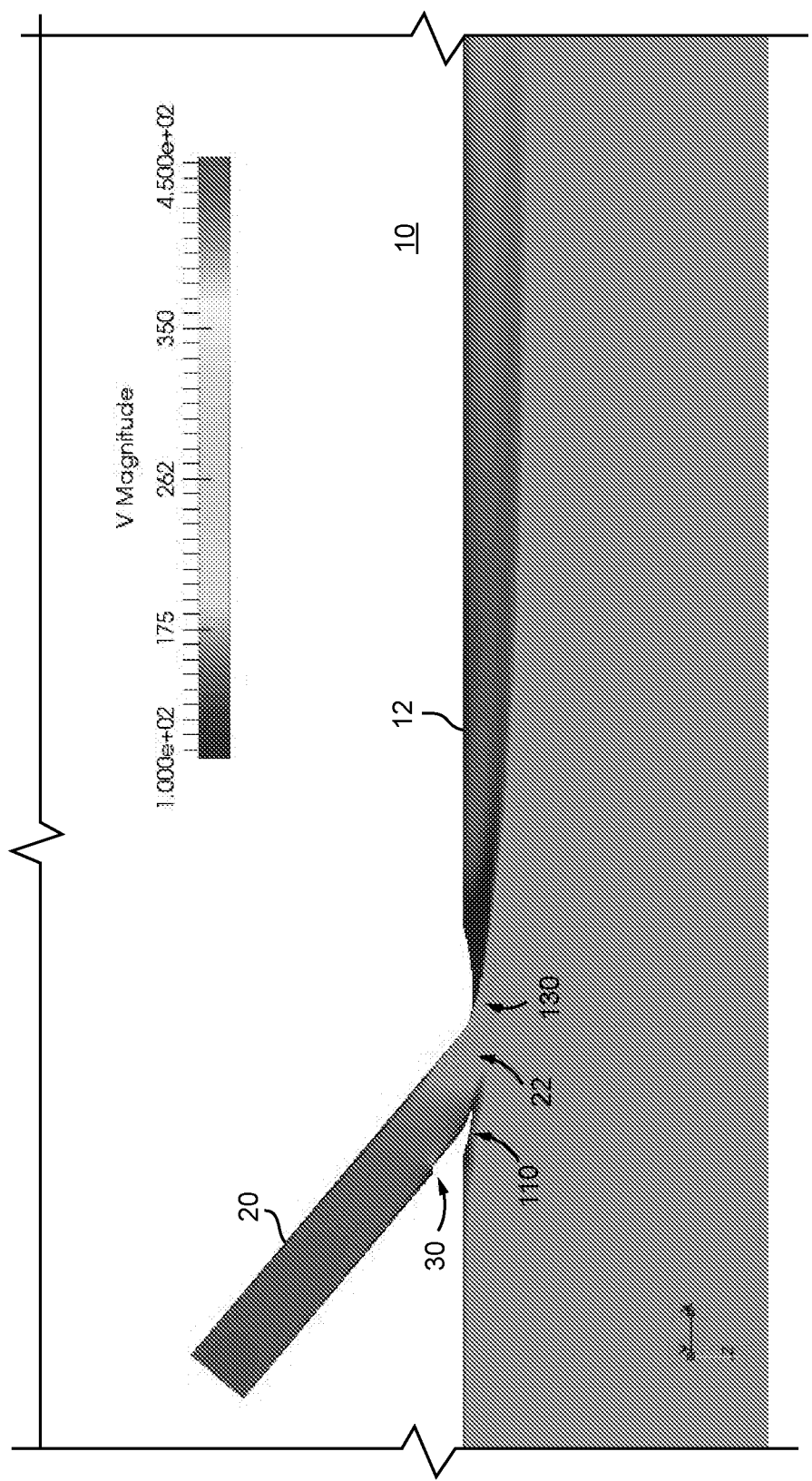
FIG. 10 is a cross-sectional view of the aircraft having the outlet port fairing assembly of FIG. 4 mounted about the angled duct outlet port and displaying a computer simulation of non-turbulent air flow patterns being exhibited within and around the duct outlet port.
Figure 11A:
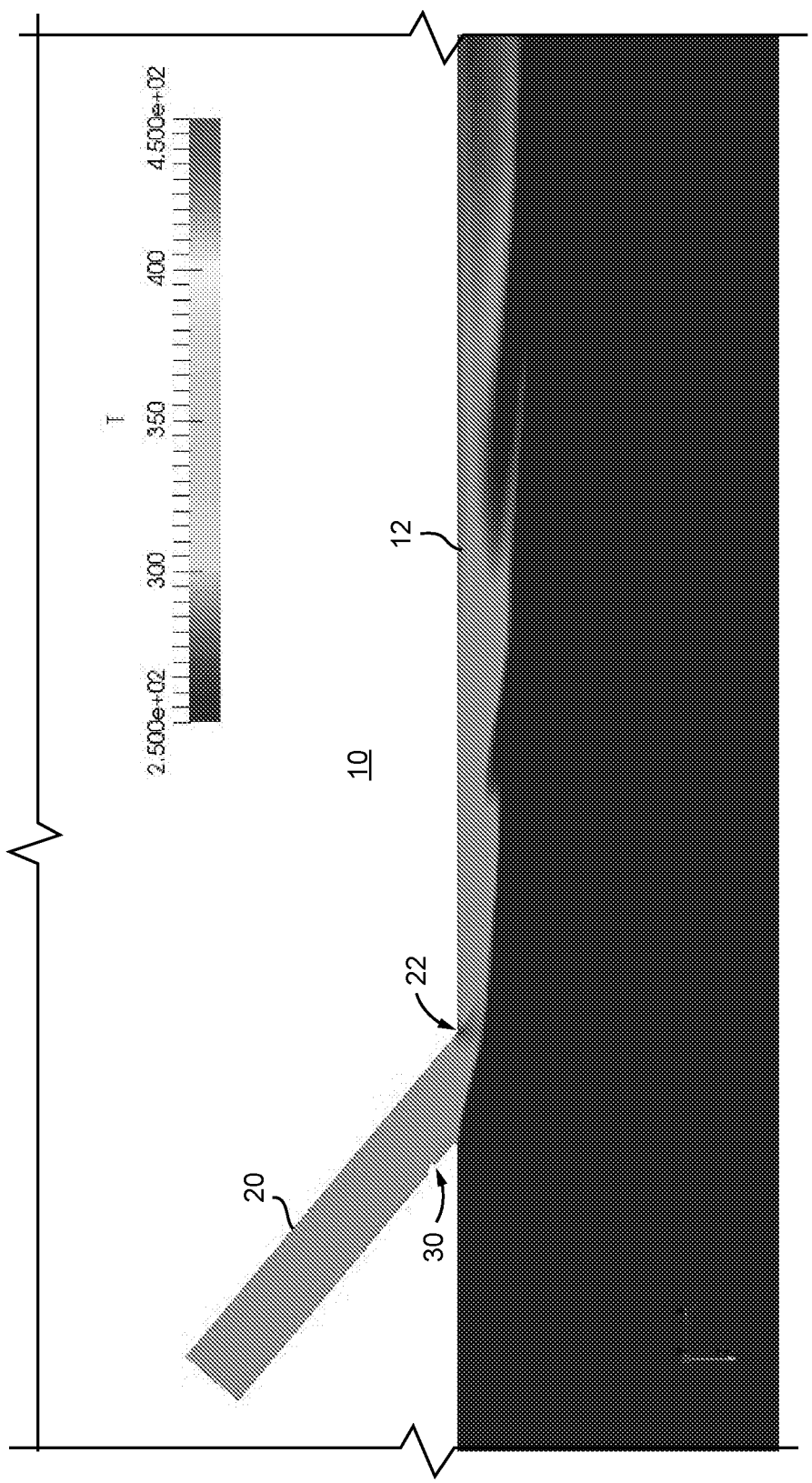
FIG. 11A (prior art) and FIG. 11B are cross-sectional views of the aircraft without and with the outlet port fairing assembly mounted about the duct outlet fairing assembly, respectively, and comparatively displaying computer simulations of mixing of high temperature, low velocity duct flow with low temperature, high velocity surface flow within and around the duct outlet port with and without the duct outlet fairing assembly.
Figure 11B:
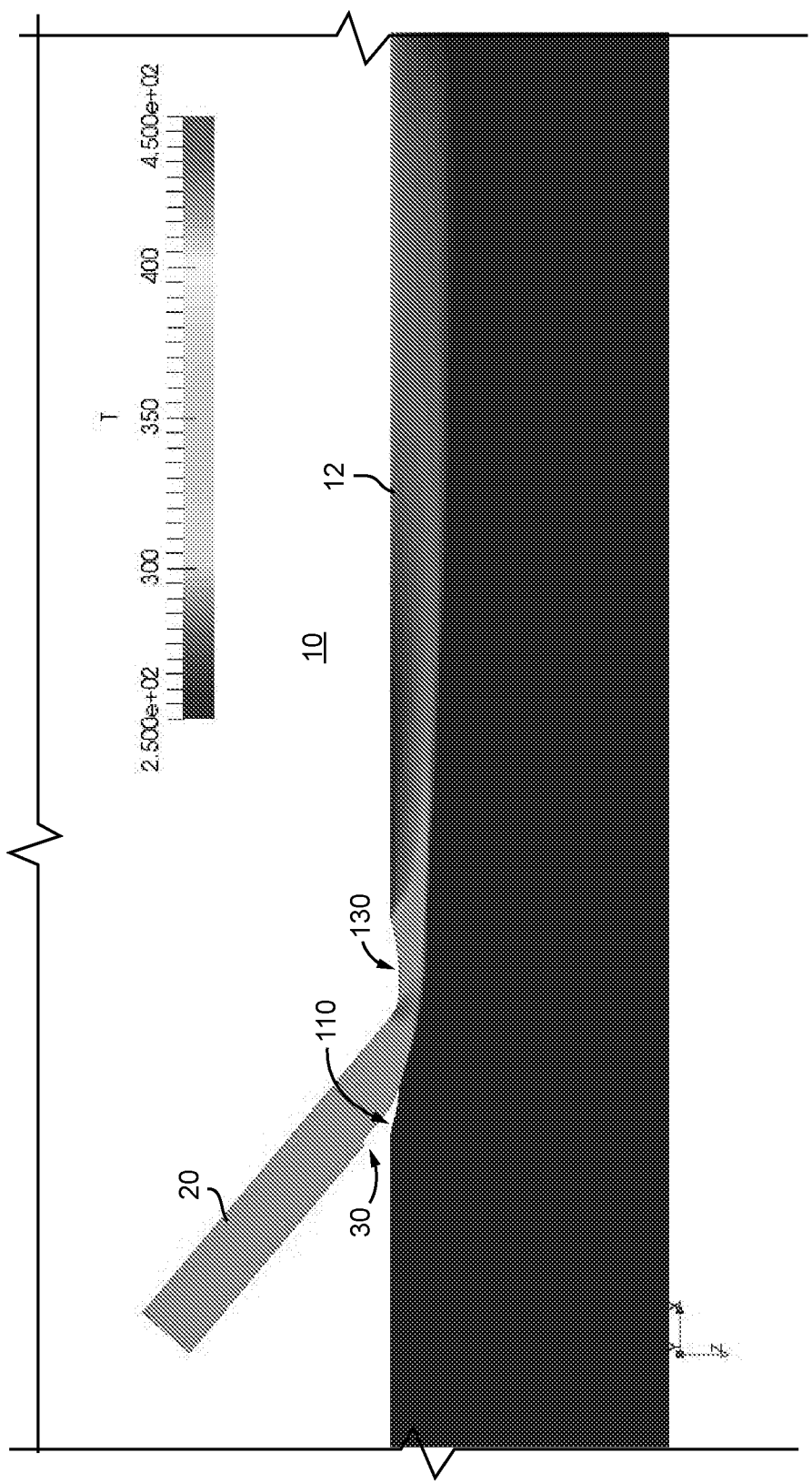

FIGS. 3, 10, 11A-11B are representations of various views of screen shots of computer-simulated aircraft to illustrate comparative effects on airflow with and without the duct outlet fairing assembly 100 of the present invention mounted on the aircraft. FIGS. 3A and 11A are cross-sectional views of a prior art aircraft without the duct outlet fairing assembly 100 of the present invention. FIGS. 10 and 11B are cross-sectional views of the aircraft with the duct outlet fairing assembly 100 of the present invention mounted on a portion of the fuselage. The drawings were taken from color-coded computer simulations which were configured and performed by the inventors using the well-known NASA "Common Resource Model" (CRM) from the 5th AIAA Drag Prediction Workshop, although such simulation program is not considered limiting. The simulations conducted were from an industry standard model of a 767/777/A330/A350 class aircraft. The CRM is used throughout the industry in wind tunnel and computational fluid dynamics (CFD) work to develop an understanding of drag and how to predict it. The figures illustrate air flow over unmodified model aircraft without the duct output port fairing assembly and modified models with the angled duct output port fairing assembly mounted about an angled duct output port located on the fuselage of the aircraft. In interpreting these images, undesirable flow from the angled duct 20 causing drag is bent or recirculated (e.g., reversed), while lower drag flow bends and recirculates less. High surface pressure areas (HP) are illustrated by darker shading, as compared to low surface pressure (LP) areas which are illustrated by lighter shading at specific areas of the aircraft.

Figure 3:
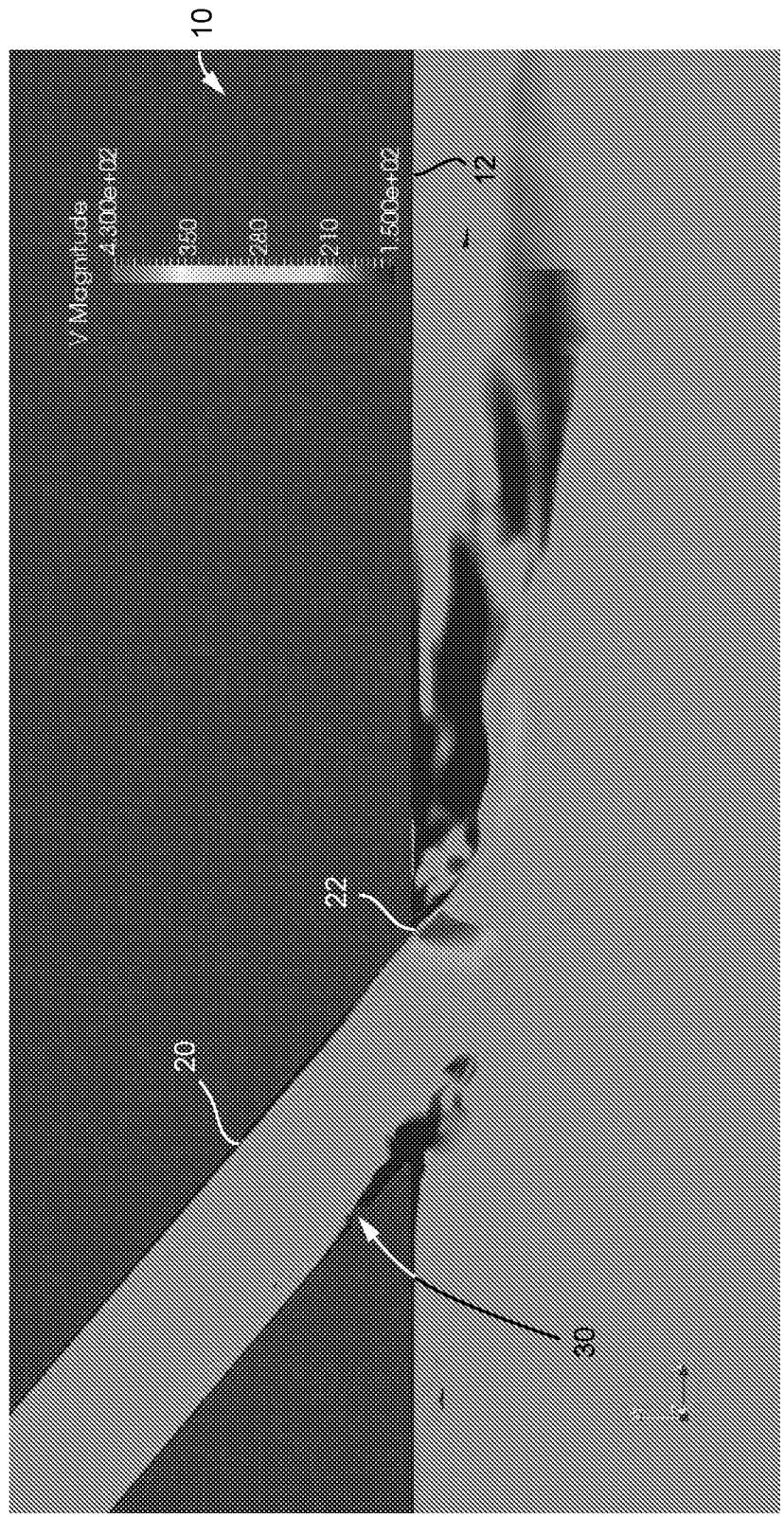
FIG. 3 is a prior art, cross-sectional view of the angled duct and duct outlet port of FIG. 1 displaying a computer simulation of turbulent air flow within and around the duct outlet port of the aircraft.

Referring to FIG. 3, a significant amount of turbulence is caused by the obstruction 30 in the angled duct 20, as well as the duct flow exiting the duct outlet port 22, and colliding with the surface flow stream. By comparison, FIG. 10 illustrates that the recirculation and restriction within the duct is predominately eliminated by the forward vane 110, and the mixing of the duct flow and surface flow over the Coanda fairing 130, which is further guided and streamlined between the pair of vortex generators 150 results in a smoothed, less turbulent surface flow rearward of the Coanda fairing 130.

Referring to FIG. 11A, a temperature plot shows disorganized mixing of high temperature, low velocity duct flow with low temperature, high velocity surface flow for the unmodified duct outlet port 22. By contrast, FIG. 11B illustrates organized temperature flow mixing for the modified duct outlet port 22 with the fairing assembly 100 of the present invention. Accordingly, FIGS. 3 and 11A illustrate undesirable large angles of recirculating air flow exits the angled duct outlet port 22. By contrast the duct outlet fairing assembly 100 of the present invention causes the air flow to dampen or flatten around the Coanda fairing 130 and streamline between the pair of vortex generators 150 so that the combined or resultant surface and duct flows with minimal turbulence closer to the surface 12 of the aircraft 10.

The fairing assembly 100 can be constructed of molded fiberglass and epoxy for electromagnetic transparency in multiple steps. Alternatively, the fairing can be fabricated from composite materials such as quartz, fiberglass, carbon fiber, Kevlar, Vectran or other aerospace grade reinforcing fibers and plastics. The fairing assembly 100 can also be fabricated from metals such as aluminum, steel, stainless steel, titanium or other aerospace grade metals, or a combination of composite and metal materials. Processes for fabricating the fairing assembly 100 can include molding, machining, additive manufacturing, or combination of these practices. Once the fabrication process of the fairing assembly 100 is completed, the fairing assembly can be attached as a kit to older aircraft, or incorporated in to the fuselage a part of a new aircraft design.

Advantageously, the present duct outlet firing assembly 100 can be implemented after the fuselage designs have been frozen or are already in production. For a newly designed aircraft, the fairing assembly can be iterative and be optimized with regard to the other components. A person of ordinary skill in the art will appreciate that other embodiments of the duct outlet fairing assembly 100 can be formed and positioned in a similar manner described above for various aircraft models and at different locations on the fuselage.

While the foregoing is directed to embodiments of the present invention, other and further embodiments and advantages of the invention can be envisioned by those of ordinary skill in the art based on this description without departing from the basic scope of the invention, which is to be determined by the claims that follow.

What is claimed is:

1. A duct outlet fairing assembly for reducing drag of a duct outlet port of an angled duct in a vehicle, the angled duct being a cylindrical duct and angled with respect to an exterior surface of the vehicle, the duct outlet fairing assembly comprising:
   a vane fairing having a ramp portion that includes a leading edge configured to be mounted forward of a leading edge of the duct outlet port, the ramp portion configured to extend rearwardly away from an exterior surface of the vehicle and over a portion of the duct outlet port, the ramp portion configured to be aligned in a direction of a longitudinal axis of the vehicle;
   a Coanda fairing having an elongated body with a leading edge configured to circumscribe at least a portion of an arcuate trailing edge of the duct outlet port, the elongated body having a predetermined height and a predetermined width, and configured to extend rearwardly a predetermined length, wherein each of the predetermined height, the predetermined width, and the predetermined length are based on a dimension of the duct outlet port; and
   a pair of vortex generators configured to be positioned rearwardly of the duct outlet port, each vortex generator configured to be positioned on an opposing lateral side of the Coanda fairing and angled towards each other.

2. The duct outlet fairing assembly of claim 1, wherein the ramp portion of the vane fairing has a curved upper surface to direct a surface air flow along the exterior surface of the vehicle at a sloped angle away from the duct outlet port.

3. The duct outlet fairing assembly of claim 1, wherein the ramp portion of the vane fairing has a curved lower surface to direct or turn a duct fluid flow exiting the duct outlet port in a direction towards the Coanda fairing.

4. The duct outlet fairing assembly of claim 1, wherein the ramp portion of the vane fairing has a predetermined length based on the dimension of the duct outlet port.

5. The duct outlet fairing assembly of claim 4, wherein the ramp portion of the vane fairing has a length as measured between its leading edge and trailing edge, when installed on the vehicle, of 0.5 to 0.9 times a diameter of the angled duct.

6. The duct outlet fairing assembly of claim 5, wherein the ramp portion of the vane fairing has a predetermined height as measured from the exterior surface of the vehicle, when installed on the vehicle, based on a sine of one-half of a duct angle and the length of the ramp portion, wherein the duct angle is measured between the exterior surface of the vehicle and an axis of the angled duct.

7. The duct outlet fairing assembly of claim 1, wherein the vane fairing further includes a tongue portion configured to extend into the angled duct.

8. The duct outlet fairing assembly of claim 7, wherein the tongue portion is configured to extend a distance that is sufficient to cover a structural obstruction within the angled duct.

9. The duct outlet fairing assembly of claim 1, wherein the Coanda fairing is deltoid in shape.

10. The duct outlet fairing assembly of claim 1, wherein the Coanda fairing has a height in a range of 0.15 to 0.25 times a diameter of the angled duct per forty-five degrees of duct angle, wherein the duct angle is measured between the exterior surface of the vehicle and an axis of the angled duct.

11. The duct outlet fairing assembly of claim 1, wherein the Coanda fairing has a length in a range of 1.5 to 3.0 times a diameter of the angled duct per forty-five degrees of duct angle, wherein the duct angle is measured between the exterior surface of the vehicle and an axis of the angled duct.

12. The duct outlet fairing assembly of claim 1, wherein each of the pair of vortex generators extends substantially perpendicular from the exterior surface of the vehicle.

13. The duct outlet fairing assembly of claim 1, wherein each of the pair of vortex generators are configured to be positioned aft of the duct outlet port within two duct diameters.

14. The duct outlet fairing assembly of claim 1, wherein each of the pair of vortex generators are configured to be angled between fifteen and thirty degrees to a centerline of the duct outlet port to thereby generate counter rotating vortices which converge behind the Coanda fairing.

15. The duct outlet fairing assembly of claim 1, wherein each of the pair of vortex generators includes a base which is mounted to the exterior surface of the vehicle and a dorsal member which extends outwardly and substantially perpendicular from the base.

16. The duct outlet fairing assembly of claim 15, wherein the dorsal member of each of the pair of vortex generators has a curved leading edge.

17. A duct outlet fairing assembly for reducing drag of a duct outlet port of an angled duct in a vehicle, the duct outlet fairing assembly comprising:
a vane fairing configured to be positioned on a surface plane of the vehicle, the vane fairing comprising a ramp portion that includes a leading edge configured to be positioned forward of a leading edge of the duct outlet port, the ramp portion configured to extend aft and away from the surface plane of the vehicle and over at least a portion of the duct outlet port;
a Coanda fairing configured to be positioned on the surface plane of the vehicle aft of the duct outlet port, the Coanda fairing comprising an elongated body having a predetermined height and a predetermined width, and configured to extend longitudinally a predetermined length, wherein each of the predetermined height, the predetermined width, and the predetermined length are based on a dimension of the duct outlet port; and
a pair of vortex generators configured to be positioned on the surface plane of the vehicle aft of the duct outlet port, each vortex generator configured to be positioned on an opposing lateral side of the Coanda fairing and angled towards each other.

18. The duct outlet fairing assembly of claim 17, wherein the vane fairing further comprises a tongue portion configured to extend into the angled duct.

19. A duct outlet fairing assembly for reducing drag of a duct outlet port of an angled duct in a vehicle, the duct outlet fairing assembly comprising:
a vane fairing configured to be positioned on a surface plane of the vehicle, the vane fairing comprising a ramp portion that includes a leading edge configured to be positioned forward of a leading edge of the duct outlet port, the ramp portion configured to extend aft and away from the surface plane of the vehicle and over at least a portion of the duct outlet port; and
a Coanda fairing configured to be positioned on the surface plane of the vehicle aft of the duct outlet port, the Coanda fairing comprising an elongated body having a predetermined height and a predetermined width, and configured to extend longitudinally a predetermined length, wherein each of the predetermined height, the predetermined width, and the predetermined length are based on a dimension of the duct outlet port.

20. The duct outlet fairing assembly of claim 19, wherein the vane fairing further comprises a tongue portion configured to extend into the angled duct.

21. The duct outlet fairing assembly of claim 20, wherein the tongue portion is configured to extend a distance that is sufficient to cover a structural obstruction within the angled duct.

22. The duct outlet fairing assembly of claim 18, wherein the tongue portion is configured to extend a distance that is sufficient to cover a structural obstruction within the angled duct.

* * * * *